June 8, 1954 — L. E. SHAW — 2,680,323
GOPHER TRAP
Filed July 26, 1952
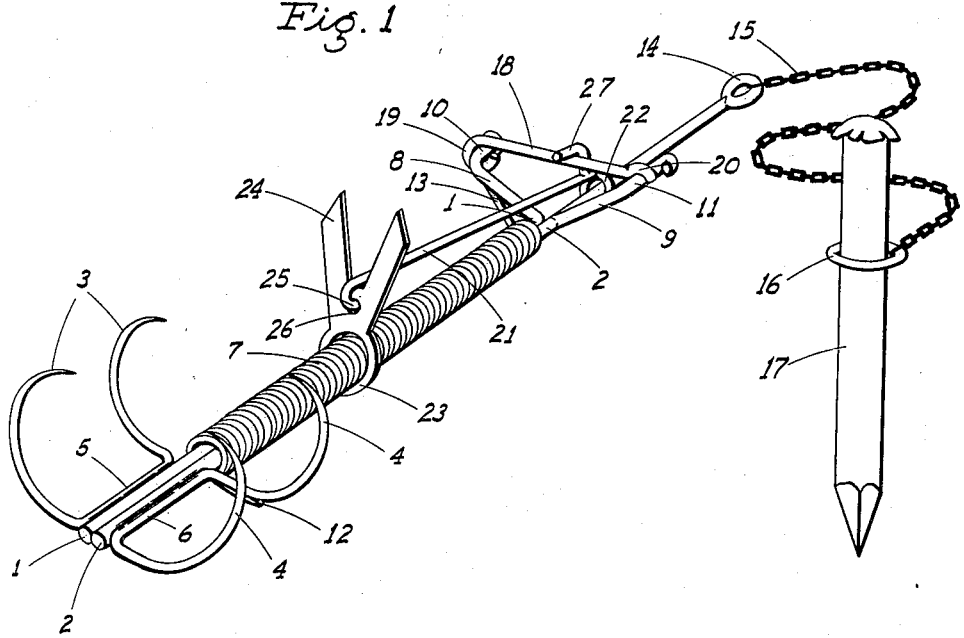
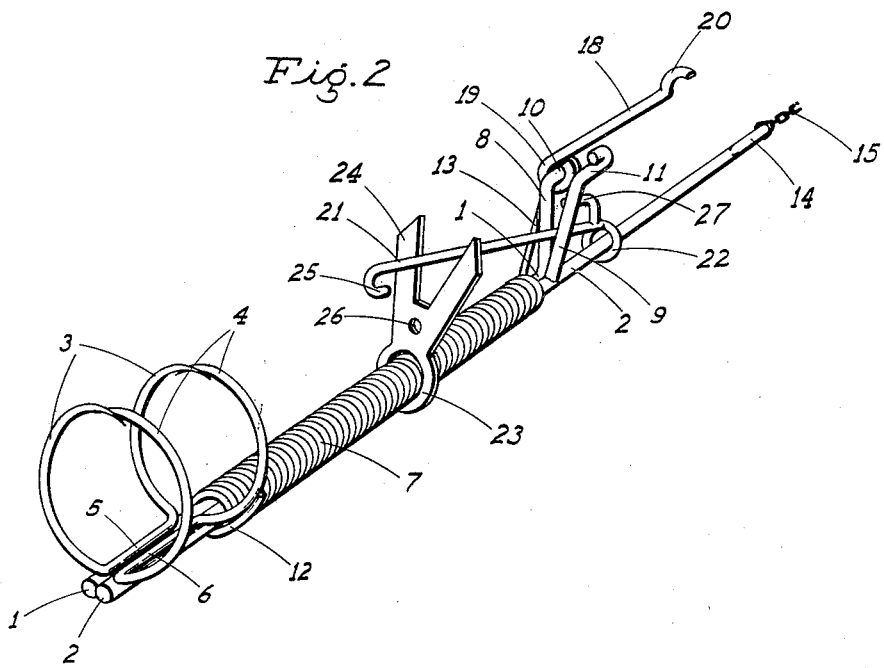
INVENTOR
LOREN E. SHAW
BY
Webster & Webster
ATTY'S Patented June 8, 1954

2,680,323

UNITED STATES PATENT OFFICE 2,680,323

GOPHER TRAP

Loren E. Shaw, Livingston, Calif.

Application July 26, 1952, Serial No. 301,145

2 Claims. (Cl. 43—91)

This invention relates generally to animal traps.

In particular the invention is directed to, and it is a major object to provide, a trap designed for rodents, such as gophers.

Another important object of the invention is to provide a gopher trap which is strong and positive in action; the trap including an effective trigger mechanism which assures of a maximum of catches.

An additional object of the invention is to provide a gopher trap which, when set, is of compact structure, thus capable of being readily placed in a gopher hole; the trigger mechanism being arranged so that a person can see from the rear end of the trap whether or not it has been tripped and the jaws at the other end of the trap closed.

Another object of the invention is to provide a gopher trap designed so that the gopher, as it advances in the hole—pushing dirt ahead of it—, is in proper position for trapping when the advancing dirt engages and actuates the trigger mechanism.

It is also an object of the invention to provide a gopher trap which is designed for ease and economy of manufacture.

Still another object of the invention is to provide a practical, reliable, and durable gopher trap, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the gopher trap as set.

Fig. 2 is a similar view, but shows the trap as sprung.

Referring now more particularly to the characters of reference on the drawings, the improved gopher trap comprises a pair of stiff longitudinal rods 1 and 2 disposed in side by side relation.

At the forward ends thereof the rods 1 and 2 carry opposed, inwardly facing pairs of arcuate jaws 3 and 4; said pairs of jaws being integral at their inner ends with related cross bars 5 and 6 which lie in parallel engagement with, and are welded to, the rods 1 and 2.

An elongated, helical torsion spring 7 of substantial strength but relatively small diameter surrounds the side by side rods 1 and 2 rearwardly of the pairs of jaws 3 and 4; the rods 1 and 2 being capable of independent rotation within the confines of the spring 7.

Adjacent but slightly beyond the rear end of the spring 7 the rods 1 and 2 are formed with out-turned or radial arms 8 and 9, which arms upstand in slightly diverging relation when the trap is sprung.

At the outer ends thereof the radial arms 8 and 9 are formed with rearwardly turned fingers 10 and 11 disposed parallel to the longitudinal axis of the trap.

At the forward end of the spring 7 its projecting end 12 is welded to one of the jaws 4, while at the opposite end of said spring the corresponding projecting end 13 is welded to the radial arm 8.

The spring 7 is always under load, tending thus to oppositely rotate the rods 1 and 2 in directions to close the jaws 3 and 4, and to swing the radial arms 8 and 9 toward each other.

The rod 2 is extended somewhat beyond the radial arm 9, and at its outer end is formed with an eye 14 connected to a chain 15 having a ring 16 on its free end; the ring 16 surrounding a stake 17. This arrangement serves to anchor the trap.

The following novel trigger mechanism is employed in connection with the trap:

When the trap is set, the arms 8 and 9 are forced apart, as in Fig. 1, to cause opening of the jaws 3 and 4; said arms being releasably held apart by a transverse trigger bar 18.

The trigger bar 18 is formed at one end with an eye 19 which loosely surrounds the finger 10 of arm 8, while the opposite end of said bar 18 is formed with a downwardly facing, substantially semi-circular hook 20 which engages over the finger 11 of radial arm 9.

With the trigger bar 18 held in position—i. e. against outward swinging motion—in the manner hereinafter described, the radial arms 8 and 9 are thus releasably held apart against the torsion of springs 7.

A longitudinal trigger rod 21 extends forwardly between the spread-apart arms 8 and 9 from an eye 22 slidable on the extended portion of the rod 2; such trigger rod 21 passing beneath the trigger bar 18.

Intermediate the ends thereof the spring 7 is surrounded in loose-play relation by a ring 23 formed on the lower end of an upstanding, V-shaped trigger plate 24.

The rod 21 normally extends through the bottom lower portion of the V-notch in plate 24, and at its forward end said rod 21 includes a down-turned, rearwardly facing hook 25 which engages for easy release through a catch-hole 26 in the trigger plate 24 adjacent but below said V-notch. With the rod 21 thus catch-engaged with the trigger plate 24, said rod is normally held against upward swinging.

The rod has an upstanding, forwardly opening trigger hook 27 on its rear portion engaged in somewhat hair-trigger relation over the bar 18, normally holding the latter against upward escape.

After the trap is set in the manner described, and as shown in Fig. 1, such trap is placed in the gopher hole with the forward or jaw end foremost, the stake 17 being driven into the ground outside the hole. Thereafter, as a gopher moves along in the hole toward the trap, the dirt which the gopher commonly pushes ahead of it, engages the trigger plate 24 when the gopher is disposed between the open jaws 3 and 4. Immediately upon the trigger plate 24 being pushed slightly toward the rear of the trap, hook 25 escapes catch-hole 26, and rod 21 swings upwardly, whence hook 27 clears bar 18, the latter likewise swinging upwardly, and then hook 20 escapes finger 11. When this occurs the radial arms 8 and 9 instantly snap together, as do the jaws 3 and 4, effectively trapping the gopher between the latter.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A gopher trap comprising a pair of longitudinal rods in side by side relation, cooperating jaws on the rods at the forward end, arms projecting from the rods in corresponding relation to the jaws but spaced some distance therefrom, a loaded helical torsion spring surrounding the rods between the jaws and arms, the spring being connected at the forward end to one jaw and at the rear end to the opposed arm, one rod being extended rearwardly beyond the corresponding arm, any eye slidable on the extended portion of said one rod, a trigger rod integral with the eye and projecting forwardly therefrom between the arms, a ring surrounding the spring in free-play relation intermediate the jaws and arms, an upstanding V-shaped trigger plate on the ring, the trigger rod extending from the rear through the V of said plate, the latter having a catch hole therethrough below said V, a down-turned rearwardly facing hook on the forward end of said rod quick-releasably engaged in said catch hole, fingers on the free ends of the arms parallel to the longitudinal axis of the spring, a transverse trigger bar pivoted at one end on one finger and having a downwardly opening substantially half-circle hook on the other end engaging over the other finger when the arms are swung apart, and an upstanding forwardly opening hook on the trigger rod quick-releasably engaged over said trigger bar from the rear.

2. A gopher trap comprising a pair of longitudinal rods in side by side relation, cooperating jaws on the rods at the forward end, arms projecting from the rods in corresponding relation to the jaws but spaced some distance therefrom, a loaded helical torsion spring extending lengthwise of and adjacent the rods between the jaws and arms and operatively connected to the jaws to close the same, fingers on the outer end of the arms disposed parallel to the axes of the rods, a transverse trigger bar pivoted at one end on one finger and having a downwardly opening shallow hook on the other end engaging over the other finger in quick-releasable relation when the arms are swung apart, a rearwardly swingable trigger plate mounted on and upstanding from the trap rearwardly of the jaws, said plate being formed with a vertical slot, an upwardly swingable trigger rod extending through said slot from the rear, said plate having a hole below the slot, a downturned rearwardly facing hook on the forward end of the trigger rod quick-releasably engaged in said hole from in front of the plate, an eye on the rear end of the trigger rod slidable on one of the first named rods rearwardly of the arms, and an upstanding forwardly opening hook on the trigger rod quick-releasably engaged over said trigger bar from the rear when the first named hook on said trigger rod is engaged in the trigger plate hole.

References Cited in the file of this patent

UNITED STATES PATENTS

| Number | Name | Date |
|---|---|---|
| 975,098 | Wyman | Nov. 8, 1910 |
| 1,222,024 | Pewther | Apr. 10, 1917 |
| 1,574,847 | Palmer et al. | Mar. 2, 1926 |
| 2,095,101 | Pewther | Oct. 5, 1937 |